(12) United States Patent
Harris

(10) Patent No.: US 6,481,592 B2
(45) Date of Patent: Nov. 19, 2002

(54) FUEL TANK VENT VALVE

(75) Inventor: Robert Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/840,519

(22) Filed: Apr. 23, 2001

(65) Prior Publication Data

US 2002/0153375 A1 Oct. 24, 2002

(51) Int. Cl.[7] .............................................. B65D 51/16
(52) U.S. Cl. ..................... 220/203.24; 220/DIG. 33; 220/581
(58) Field of Search ....................... 220/203.24, 203.26, 220/203.28, 303, DIG. 33, DIG. 32, 581, 582, 203.27, 203.29

(56) References Cited

U.S. PATENT DOCUMENTS

| | | | | |
|---|---|---|---|---|
| 3,937,357 A | * | 2/1976 | Burgess | 220/44 A |
| 4,000,633 A | | 1/1977 | Evans | |
| 4,000,828 A | * | 1/1977 | Crute et al. | 220/203 |
| 4,091,955 A | | 5/1978 | Sloan, Sr. | |
| 4,185,751 A | * | 1/1980 | Moore et al. | 220/203 |
| 4,337,873 A | * | 7/1982 | Johnson | 137/493.8 |
| 4,420,392 A | | 12/1983 | Harris | |
| 4,498,493 A | | 2/1985 | Harris | |
| 4,561,559 A | * | 12/1985 | Rutan et al. | 137/493.5 |
| 4,676,390 A | | 6/1987 | Harris | |
| 4,691,734 A | * | 9/1987 | Fort | 137/493.4 |
| 5,108,001 A | | 4/1992 | Harris | |
| 5,148,934 A | * | 9/1992 | Kasugai et al. | 220/203 |
| 5,394,900 A | * | 3/1995 | Okuyama et al. | 137/510 |
| 5,540,347 A | | 7/1996 | Griffin | |
| 6,026,848 A | | 2/2000 | Huynh | |
| 6,095,363 A | * | 8/2000 | Harris et al. | 220/203.24 |
| 6,273,286 B1 | * | 8/2001 | Segrest, III | 220/203.26 |

* cited by examiner

*Primary Examiner*—Stephen P. Garbe
*Assistant Examiner*—Lien Ngo
(74) *Attorney, Agent, or Firm*—Barnes & Thornburg

(57) ABSTRACT

A pressure and vacuum vent valve for a vehicle fuel tank is provided including a structure defining a passageway and having a vent valve assembly positioned therein. The assembly includes a pressure relief valve to relieve pressure from the fuel tank when the pressure exceeds a predetermined level and a vacuum relief valve to relieve a vacuum in the tank when the pressure in the tank drops below a predetermined level. The vacuum relief valve presents a lubricious sealing surface that engages a valve seat. The pressure valve engages a sealing surface to close a central venting orifice provided in the vacuum valve.

15 Claims, 2 Drawing Sheets

FUEL TANK VENT VALVE

BACKGROUND AND SUMMARY

The present application relates to a vent valve assembly and particularly to a pressure and vacuum relief assembly for a vehicle fuel tank.

Conventional pressure and/or vacuum relief valve assemblies for vehicle fuel tanks are generally known and are in relatively widespread use. Examples include U.S. Pat. No. 4,498,493 to Harris; U.S. Pat. No. 4,779,755 to Harris; and U.S. Pat. No. 5,794,806 to Harris et al., the disclosures of which are incorporated by reference herein.

It is desirable to provide an assembly that vents a fuel tank when a predetermined pressure or vacuum develops in the tank and that minimizes leakage of fuel vapor.

According to the present application, an apparatus is provided including a valve assembly to relieve pressure and vacuum levels in a fuel tank. The valve assembly comprises a structure providing a valve passageway communicating with the interior of the fuel tank. The passageway provides an axially inwardly facing annular valve seat or edge surrounding an orifice. A vacuum valve member is normally biased to close the orifice. Illustratively, the vacuum valve member provides a frustoconical outer wall facing and extending into the orifice and the outer wall presents a lubricious surface that abuts the valve seat to close the orifice. The vacuum valve member preferably carries a lubricious sealing member which engages the passageway.

In illustrative embodiments, the vacuum valve member includes an intermediate wall that is coupled to the outer wall and faces axially outwardly. The intermediate wall is coupled to an inner frustoconical wall defining a central venting orifice to vent pressure from the fuel tank. The intermediate and inner walls preferably present lubricious surfaces. In illustrative embodiments, the lubricious surfaces are included on the sealing member presented by the outer, intermediate, and inner walls of the vacuum valve member.

The valve assembly further includes a pressure valve member that normally closes the central orifice. The pressure valve member includes an annular valve lip to engage the lubricious surface presented by the intermediate wall and includes an annular rim spaced apart from the lip to engage the lubricious surface presented by the inner wall. Thus, a dual seal is formed to normally close the central venting orifice.

In illustrative embodiments, the vacuum valve member is biased by a first spring so that the surface presented by the outer wall normally engages the edge or valve seat, closing the orifice. The pressure valve is biased by a second spring so that the lip and the rim engage the surfaces presented by the intermediate and inner walls of the vacuum valve member to close the central venting or pressure orifice.

When the pressure in the fuel tank exceeds a predetermined level, the pressure valve member moves axially outwardly. The lip and the rim disengage the intermediate and inner walls of the vacuum valve member or the sealing member carried thereon, opening the central venting orifice. With the central venting orifice opened, fluid flows from the tank through the central venting orifice, relieving pressure in the fuel tank. After the pressure in the fuel tank reaches an acceptable pressure level, the second spring again biases the pressure valve member to close the central venting orifice.

When the vacuum level in the fuel tank exceeds a predetermined level, the vacuum valve member moves axially inwardly. The vacuum valve member disengages the valve seat, opening the orifice. With the orifice opened, fluid flows past the orifice and toward the fuel tank, relieving the vacuum in the fuel tank. After the pressure in the fuel tank reaches an acceptable vacuum level, the first spring again biases the vacuum valve member to close the orifice.

Additional objects, features, and advantages of the present application will become apparent to those of ordinary skill in the art upon consideration of the following detailed description of preferred embodiments exemplifying the best mode of carrying out the subject matter of this application as presently perceived.

BRIEF DESCRIPTION OF THE DRAWINGS

The detailed description particularly refers to the accompanying figures in which.

DETAILED DESCRIPTION OF THE PREFERRED EMBODIMENTS

Figure 1:
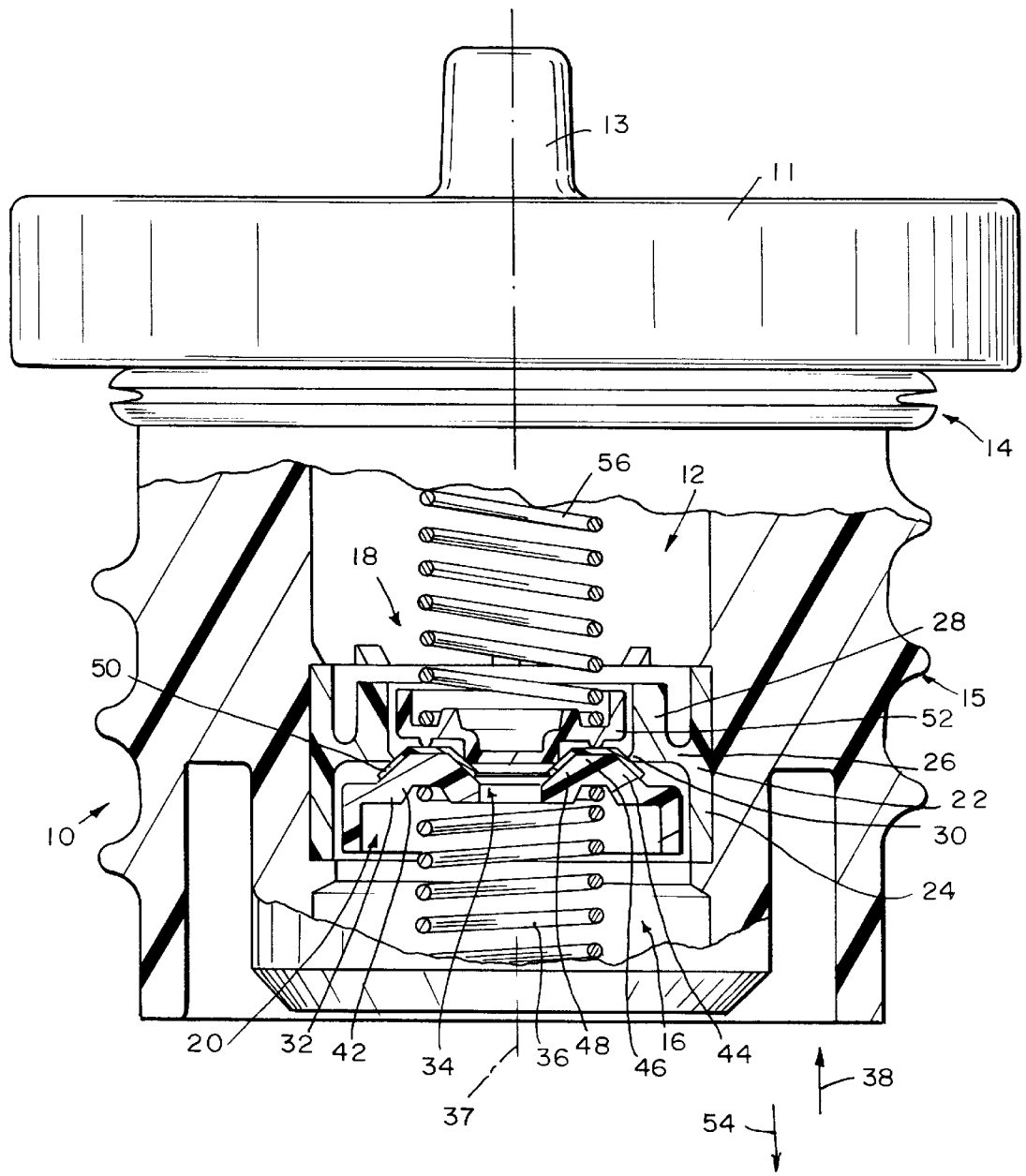
FIG. 1 is a front, partially sectioned view of a pressure and vacuum vent valve assembly.
Figure 2:
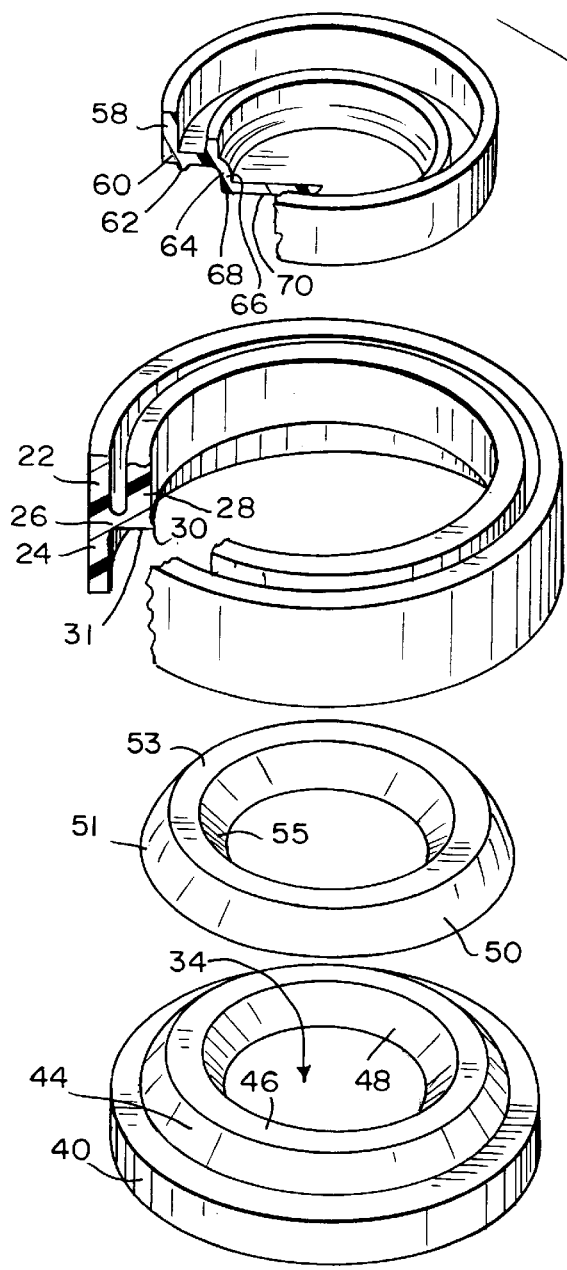
FIG. 2 shows an exploded view of the vent valve assembly of FIG. 1 with portions broken away.

A pressure and vacuum vent valve for a vehicle fuel tank in accordance with the present application includes a housing 10 defining a passageway 12 extending therethrough communicating with a fuel tank (not shown) and the atmosphere. Passageway 12 includes a central axis 37. A valve assembly 16 is positioned within housing 10 and normally closes passageway 12. Valve assembly 16 includes a pressure relief valve 18 having a pressure valve member 52 that moves axially outwardly to release pressure from the fuel tank when the pressure level in the tank exceeds a predetermined level. Valve assembly 16 further includes a vacuum relief valve 20 having a vacuum valve member 32 that moves axially inwardly to open passageway 12 to relieve the vacuum in the tank when the vacuum level in the tank exceeds a predetermined level.

In an illustrative embodiment, the valve assembly is placed in a closure or fuel cap for a vehicle fuel tank filler neck. Thus, the illustrative embodiment includes shell 11, raised operating handle 13, gasket 14, and threads 15 that operate in a conventional fashion to close and seal a filler neck. However, it is within the scope of this application to position the valve assembly at other locations communicating with the fuel tank including, but not limited to, placement in an orifice formed in a fuel tank.

Valve assembly 16 includes a valve seat 22 having an axially extending annular body 24 coupled to an interior of housing 10. Body 24 is coupled to a radially inwardly extending annular projection 26, the projection being coupled to an axially outwardly extending annular protrusion 28. Projection 26 has an annular edge or surface 30 extending radially inwardly into passageway 12, the edge defining an orifice 31.

As shown in FIG. 1, valve assembly 16 includes a first axially movable valve member 32, sometimes referred to herein as a vacuum valve member, defining a central venting orifice 34. First valve member 32 is biased by a first biasing member 36 in an axially outward direction 38. In illustrative embodiments biasing member 36 is shown as a spring, but other known biasing devices are within the scope of this application.

Figure 3:
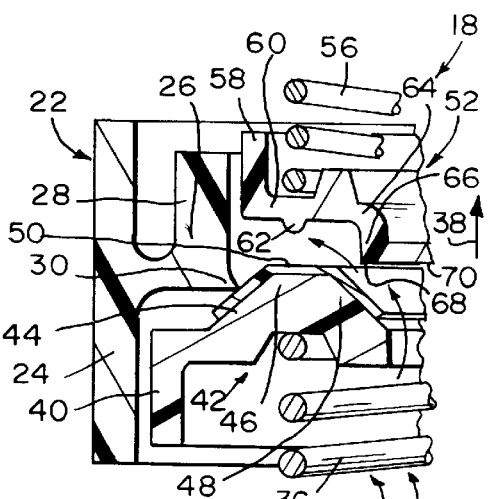
FIG. 3 shows a sectional view of the vent valve assembly of FIG. 1 with portions broken away, showing the valve assembly in a pressure relieving position.
Figure 4:
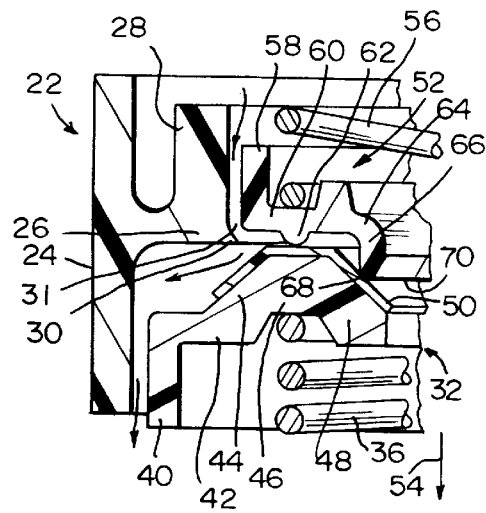
FIG. 4 is a sectional view of the vent valve assembly of FIG. 1 with portions broken away, showing the valve assembly in a vacuum relieving position.

As shown in FIGS. 3 and 4, first valve member 32 includes an axially extending annular base 40 coupled to a radially outwardly and axially outwardly facing frustoconical outer wall 44, an axially outwardly facing intermediate wall 46, and a radially inwardly and axially outwardly facing frustoconical inner wall 48. As shown in FIGS. 1, 3, and 4, first valve member 32 preferably carries a sealing member 50. In illustrative embodiments, sealing member 50 includes outer, intermediate, and inner lubricious surfaces 51, 53, and 55 carried on at least a portion of the outer, intermediate, and inner walls 44, 46, 48 respectively.

In one embodiment, sealing member 50 is made of a lubricious material—a material defined herein to be relatively free from friction, to have smoothness or slipperiness. An example of a lubricious material is polytetrafluoroethylene (PTFE). The use of a lubricious material such as PTFE, due to the material's lubricious properties, eliminates the potential for sticking or wedging of valve components made of non-lubricious materials. PTFE is also known to have relatively low permeability to fuel vapor and to be resistant to swelling when in contact with fuel or fuel vapor. However, it is within the scope of this application to utilize other known materials exhibiting one or more of these properties. It is further within the scope of this application to eliminate the sealing member and mold or form the valve member or other valve components that cooperate to close passageway 12 from a lubricious material such as PTFE. Thus, in this specification and in the claims the terms "presents" or "presenting" are intended to establish that a valve member or orifice or part or surface thereof is formed from a lubricious material, covered with a lubricious material, or supporting a lubricious material.

As shown in FIG. 1, valve assembly 16 further includes a second axially movable valve member 52. Second valve member 52, sometimes referred to herein as a pressure valve member, is normally biased in an axially inward direction 54 by a second biasing member 56. In illustrative embodiments second biasing member 56 is shown to be a spring. However, it is within the scope of this application to utilize other known biasing devices.

As shown in FIGS. 3 and 4, second valve member 52 includes an axially extending annular ring 58 coupled to a radially inwardly extending annular shelf 60. Shelf 60 includes an axially extending annular valve lip 62 positioned to engage intermediate sealing surface 53 of sealing member 50. Shelf 60 is coupled to an axially inwardly extending shoulder 64 having an axially inner extension 66 defining an annular rim 68 positioned to engage sealing member 50. Rim 68 is coupled to an axially inwardly facing face 70.

In operation, valve assembly 16 serves as a pressure relief valve and as a vacuum relief valve for a fuel tank. In its normal position, as shown in FIG. 1, when the pressure and vacuum levels in the tank are below a predetermined level, no venting is necessary. In this normal position, orifice 31 and central venting orifice 34, and thus passageway 12, are closed and fluid flow into or out of the fuel tank is inhibited.

In the closed position of FIG. 1, first biasing member 36 biases first valve member 32 to close passageway 12. Specifically, first valve member 32 and outer lubricious surface 51 of sealing member 50 are biased to engage valve seat 22 at edge 30. This engagement, as shown in FIG. 1, closes orifice 31. In this position at least portions of outer, intermediate, and inner walls 44, 46, 48 and outer, intermediate, and inner lubricious surfaces 51, 53, 55 extend axially outwardly past edge 30.

Additionally in this closed position, second biasing member 56 biases second valve member 52 to close passageway 12. Specifically, pressure valve member or second valve member 52 is biased to engage sealing member 50 carried on first valve member 32 This engagement, as shown in FIG. 1, closes central venting orifice 34 formed in first valve member 32. Specifically, annular lip 62 engages intermediate sealing surface 53 carried on first valve member 32. Furthermore, annular rim 68 engages inner sealing surface 55 of sealing member 50 at a position spaced apart from the engagement of lip 62 and intermediate surface 53.

As shown in FIG. 3, when the pressure level in the fuel tank exceeds a predetermined level, second valve member 52 moves in axially outward direction 38 against the bias of second biasing member 56. As second valve member 52 moves in direction 38, lip 62 and rim 68 disengage intermediate and inner lubricious surfaces 53, 55. This opens central venting orifice 34 and allows fluid to flow from the fuel tank through central orifice 34 and through passageway 12.

As shown in FIG. 4, when a vacuum develops in the fuel tank so that the pressure in the tank is below a predetermined level, vacuum valve member or first valve member 32 moves in axially inward direction 54 against the bias of first biasing member 36, as shown in FIG. 4. Upon movement of first valve member 32 in direction 54, outer lubricious surface 51 disengages edge or surface 30 of valve seat 22. This opens orifice 31, allowing fluid to flow through orifice 31 and passageway 12 toward the fuel tank. In an illustrative embodiment, when the vacuum valve member moves axially inwardly to relieve vacuum in the fuel tank, lip 62 and rim 68 of second valve member 52 remain in contact with sealing member 50. However, alternative structures are within the scope of this application where the pressure valve member does not remain in contact with the sealing member during a portion of travel of the vacuum valve member in an axially inward direction.

Although first and second valve members 32, 52 have sometimes been described herein as relating to vacuum and pressure relief functions respectively, it is within the scope of this application to modify the structure of the valve assembly so that the first valve member serves as a pressure valve member and the second valve member serves as a vacuum valve member.

Although this application has described detail with reference to certain preferred or illustrative embodiments, variations and modifications exist within the scope and spirit of the invention as described and defined in the following claims.

What is claimed is:

1. A vehicle fuel tank vent comprising:
    a structure providing an orifice defined by a radially inwardly and peripherally extending edge, the orifice defining a central axis,
    an axially movable first vacuum relief valve member configured to normally engage and close the orifice and to open the orifice upon a certain vacuum condition occurring in the tank,
    a spring urging the first valve member into engagement with the orifice,
    the first vacuum relief valve member providing a frustoconical outer wall facing and extending axially into the orifice, and the outer wall presenting an outer lubricious sealing surface to close the orifice, wherein the first vacuum relief valve member is provided with a central venting orifice bounded by an annular frustoconical inner wall opening radially inwardly and presenting an inner lubricious sealing surface, and an axially movable second excess pressure relief valve member configured to normal close the central venting orifice and to open the central venting orifice upon an excess pressure condition occurring in the tank the second excess pressure relief valve member engaging the inner lubricious sealing surface.

2. The vehicle fuel tank vent of claim 1, wherein the first valve member provides a peripherally and radially extending intermediate wall disposed between the outer wall and the inner wall and presenting an intermediate lubricious surface, and the second valve member providing an annular lip engaging the intermediate lubricious surface.

3. The vehicle fuel tank vent of claim 2, wherein the intermediate wall is generally flat.

4. A valve assembly for venting a fuel tank, the assembly comprising:
a structure providing a valve passageway for communicating with an interior of the fuel tank and a radially inwardly facing annular valve seat surrounding an orifice,
a vacuum relief valve member normally biased in an axial direction into the orifice and against the valve seat and moveable away from the valve seat in response to a vacuum condition existing in the tank, the vacuum relief valve member having a frustoconical outer wall facing the valve seat and including a sealing member having an outer sealing surface disposed to engage the valve seat, the sealing member being carried on the vacuum relief valve member; and
wherein the assembly further comprises a pressure valve, a vacuum relief valve member provides a pressure orifice, and the pressure valve comprises a normally biased pressure valve member to close the pressure orifice.

5. The assembly of claim 4, wherein the pressure valve member includes an annular valve lip and an annular rim spaced apart from the lip, the lip and rim being normally biased to engage the sealing member to close the pressure orifice.

6. The assembly of claim 5, wherein the sealing member includes an axially outwardly facing intermediate sealing surface to engage the lip, and a radially inwardly facing frustoconical inner sealing surface to engage the rim.

7. The assembly of claim 6, wherein the intermediate and inner sealing surfaces are lubricious.

8. The assembly of claim 7, wherein the valve seat defines an orifice and wherein the value member is frustoconical to engage and extend into the orifice.

9. A fuel tank vent valve assembly comprising
a vent structure adapted to be mounted in a fuel vapor and air flow passageway formed in a fuel cap, the vent structure being formed to include a vent orifice and an annular valve seat surrounding the vent orifice, a valve assembly mounted in the vent orifice for movement between orifice-opening and orifice-closing positions, and
a lubricious sealing surface carried on the valve assembly and arranged to contact the annular valve seat and lie between the annular valve seat and the valve assembly upon movement of the valve assembly to the orifice-closing position, wherein the lubricious sealing surface is provided by a plate made of polytetrafluoroethylene material and coupled to the valve assembly and wherein the plate made of polytetrafluoroethylene material is annular and includes an outer frustoconical portion arranged to face toward the annular valve seat, an inner frustoconical portion surrounded by the outer frustoconical portion and having its frustoconical portion in a reverse direction from the outer frustoconical portion, and an intermediate annular portion arranged to lie between and interconnect the outer and inner frustoconical portions.

10. The assembly of claim 9, wherein the valve assembly includes a first valve made of a plastics material and configured to support the plate made of polytetrafluoroethylene for movement relative to the annular valve seat and a second valve made of a plastics material and formed to include a first annular sealing member contacting the inner frustoconical portion and a second annular sealing member contacting the intermediate annular portion and the intermediate annular portion is arranged to contact the annular valve seat.

11. A fuel tank vent valve assembly comprising
a vent structure adapted to be mounted in a fuel vapor and air flow passageway formed in a fuel cap, the vent structure being formed to include a vent orifice and an annular valve seat surrounding the vent orifice,
a valve assembly mounted in the vent orifice for movement between orifice-opening and orifice-closing positions, and
a lubricious sealing surface carried on the valve assembly and arranged to contact the annular valve seat and lie between the annular valve seat and the valve assembly upon movement of the valve assembly to the orifice-closing position wherein the valve assembly includes a first valve having a central axis, the first valve includes a radially outwardly facing frustoconical surface facing toward the annular valve seat, and the lubricious sealing surface includes a first frustoconical portion carried on the radially outwardly facing frustoconical surface and arranged to contact the annular valve seat upon movement of the valve assembly to the orifice-closing position and wherein the first valve includes a radially inwardly facing frustoconical surface defining at least a portion of a vent passageway through the first valve, the lubricious sealing surface further includes a second frustoconical portion carried on the radially inwardly facing frustoconical surface and having its frustoconical portion in a reverse direction from the first frustoconical portion, the valve assembly further includes a second valve having a central axis and a first annular sealing member, the second valve is positioned to lie adjacent to the first valve for movement between vent passageway-opening and vent passageway-closing positions, and the second frustoconical portion of the lubricious sealing surface is arranged to contact the first annular sealing member of the second valve and lie between the radially inwardly facing frustoconical surface and the first annular sealing member upon movement of the second valve to the vent passageway-closing position.

12. The assembly of claim 11, wherein the first valve further includes an annular surface lying between and interconnecting the radially outwardly and inwardly facing frustoconical surfaces, the second valve further includes a second annular sealing member surrounding the first annular sealing member, the lubricious second sealing surface further includes an annular portion lying between and interconnecting the first and second frustoconical portions, and the annular portion of the lubricious sealing surface is arranged to contact the second annular sealing member of the second valve and lie between the annular portion and the second annular sealing member upon movement of the second valve to the vent passageway-closing position.

13. The assembly of claim 12, further comprising means for applying yieldable biasing forces to the first and second valves to maintain the first frustoconical portion of the lubricious sealing surface in contact with the annular valve seat and to maintain the second frustoconical portion of the lubricious sealing surface in contact with the first annular sealing member of the second valve.

14. A fuel tank vent valve assembly providing both vacuum-relief and pressure relief from a fuel tank comprising a vent structure adapted to be mounted in a fuel vapor and air flow passageway formed in a fuel cap, the vent structure being formed to include a vent orifice and an annular valve seat surrounding the vent orifice, a valve assembly mounted in the vent orifice for movement between orifice-opening and orifice-closing positions, and a lubricious sealing surface carried on the valve assembly and arranged to contact the annular valve seat and lie between the annular valve seat and the valve assembly upon movement of the valve assembly to the orifice-closing position wherein the valve assembly includes a first vacuum-relief valve having a central axis, the first vacuum-relief valve includes a radially outwardly facing frustoconical surface facing toward the annular valve seat, and the lubricious sealing surface includes a first frustoconical portion carried on the radially outwardly facing frustoconical surface and arranged to contact the annular valve seat upon movement of the valve assembly to the orifice-closing position and wherein the first vacuum-relief valve further includes an annular surface appended to a radially inner edge of the radially outwardly facing frustoconical surface, the lubricious sealing surface further including an annular portion appended to a radially inner edge of the first frustoconical portion, the valve assembly further includes a second pressure-relief valve having a central axis and an annular sealing member and positioned to lie adjacent to the first vacuum-relief valve for movement between vent passageway-opening and vent passageway-closing positions, and the annular portion of the lubricious sealing surface is arranged to contact the annular sealing member of the second pressure-relief valve upon movement of the second valve to the vent passageway-closing position.

15. The assembly of claim 14, further comprising means for applying yieldable biasing forces to the first and second valves to maintain the first frustoconical portion of the lubricious sealing surface in contact with the annular valve seat and to maintain the annular portion of the lubricious sealing surface in contact with the annular sealing member of the second valve.

* * * * *